United States Patent
Pantelides et al.

(10) Patent No.: US 10,227,786 B2
(45) Date of Patent: Mar. 12, 2019

(54) ELONGATE MEMBER REINFORCEMENT WITH A STUDDED COLLAR

(71) Applicant: University of Utah Research Foundation, Salt Lake City, UT (US)

(72) Inventors: Chris P Pantelides, Salt Lake City, UT (US); Lawrence D. Reaveley, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 15/291,903

(22) Filed: Oct. 12, 2016

(65) Prior Publication Data
US 2017/0030096 A1   Feb. 2, 2017

Related U.S. Application Data

(63) Continuation-in-part of application No. 14/455,570, filed on Aug. 8, 2014, now Pat. No. 9,976,315.
(Continued)

(51) Int. Cl.
*E04G 23/02* (2006.01)
*E01D 22/00* (2006.01)
(Continued)

(52) U.S. Cl.
CPC ......... *E04G 23/0218* (2013.01); *E01D 22/00* (2013.01); *E04H 9/025* (2013.01);
(Continued)

(58) Field of Classification Search
CPC ....... E04G 23/0218; E04G 2023/0251; H04W 16/26; E04H 9/025; E01D 22/00
See application file for complete search history.

(56) References Cited

U.S. PATENT DOCUMENTS 729,176 A    5/1903  Hodeges
3,355,852 A *  12/1967  Lally ...................... E04B 1/943
                                                   52/202
(Continued)

FOREIGN PATENT DOCUMENTS

CN    2014/60026 U    5/2010
CN    203174881 U    9/2013
(Continued)

OTHER PUBLICATIONS

Ameli et al.; "Seismic evaluation of grouted splice sleeve connections for reinforced precast concrete column-to-cap beam joints in accelerated bridge construction"; Precast/Prestressed Concrete Institute Journal; Mar.-Apr. 2015; pp. 80-103.
(Continued)

*Primary Examiner* — Brent W Herring
(74) *Attorney, Agent, or Firm* — Thorpe North & Western, LLP (57) ABSTRACT

An elongate member reinforcement system and associated methods are disclosed. The system can include an elongate member, a collar secured about an end portion of the elongate member, a support layer surrounding the end portion of the elongate member, and a structural filler disposed between the support layer and the end portion of the elongate member. The collar can be disposed in the structural filler and can include a structural filler interface feature that mechanically couples the collar to the structural filler to facilitate transferring loads between the elongate member and the structural filler.

31 Claims, 7 Drawing Sheets

Related U.S. Application Data (60) Provisional application No. 61/863,802, filed on Aug. 8, 2013.

(51) Int. Cl.
*H04W 16/26* (2009.01)
*E04H 9/02* (2006.01)

(52) U.S. Cl.
CPC ............ *E04H 9/027* (2013.01); *H04W 16/26* (2013.01); *E04G 2023/0251* (2013.01)

(56) References Cited

U.S. PATENT DOCUMENTS

| | | | |
|---|---|---|---|
| 3,390,951 A * | 7/1968 | Finger | E04H 12/2292 405/216 |
| 3,645,057 A | 2/1972 | Kaplan | |
| 3,798,867 A * | 3/1974 | Starling | E02D 5/64 52/742.14 |
| 4,006,600 A | 2/1976 | Guild | |
| 4,019,301 A | 4/1977 | Fox | |
| 4,023,374 A | 5/1977 | Colbert et al. | |
| 4,116,013 A | 9/1978 | Hellmers | |
| 4,132,082 A | 1/1979 | Merjan | |
| 4,152,089 A | 5/1979 | Stannard | |
| 4,161,090 A | 7/1979 | Watts, Jr. | |
| 4,295,308 A * | 10/1981 | Korfanta | E04H 12/2261 248/158 |
| 4,306,821 A | 12/1981 | Moore | |
| 4,439,071 A | 3/1984 | Roper, Jr. | |
| 4,543,764 A | 10/1985 | Kozikowski | |
| 4,644,722 A | 2/1987 | Phillips | |
| 4,673,157 A | 6/1987 | Wells | |
| 4,702,057 A | 10/1987 | Phillips | |
| 4,779,389 A | 10/1988 | Landers | |
| 4,892,601 A | 1/1990 | Norwood | |
| 5,010,702 A * | 4/1991 | Daw | E04B 2/82 52/241 |
| 5,043,033 A | 8/1991 | Fyfe | |
| 5,177,919 A | 1/1993 | Dykmans | |
| 5,376,316 A | 12/1994 | Weekers | |
| 5,481,846 A | 1/1996 | Macchietto | |
| 5,625,988 A | 5/1997 | Killick | |
| 5,644,877 A * | 7/1997 | Wood | E04B 2/7407 52/126.3 |
| 5,878,540 A | 3/1999 | Morstein | |
| 6,123,485 A | 9/2000 | Mirmiran et al. | |
| 6,189,286 B1 | 2/2001 | Seible et al. | |
| 6,256,960 B1 * | 7/2001 | Babcock | E04B 1/14 52/281 |
| 6,364,575 B1 * | 4/2002 | Bradley | E02B 17/0026 405/211 |
| 6,536,991 B1 | 3/2003 | Trader et al. | |
| 6,599,632 B1 | 7/2003 | Gillette | |
| 6,773,206 B2 | 8/2004 | Bradley et al. | |
| 6,997,260 B1 | 2/2006 | Trader et al. | |
| 7,300,229 B1 | 11/2007 | Fyfe et al. | |
| 7,409,798 B2 | 8/2008 | Freeby et al. | |
| 7,520,535 B2 | 4/2009 | Gronquist | |
| 7,533,505 B2 | 5/2009 | Henderson | |
| 7,618,217 B2 | 11/2009 | Henderson | |
| 7,621,097 B2 * | 11/2009 | Wilhour | E02D 27/14 249/207 |
| 7,712,530 B1 | 5/2010 | Edgley et al. | |
| 7,721,494 B2 * | 5/2010 | Lee | E02D 27/00 24/21 |
| 7,748,307 B2 | 7/2010 | Hallissy et al. | |
| 8,151,526 B2 * | 4/2012 | Klein | E04B 2/7411 52/1 |
| 8,240,633 B2 | 8/2012 | Penza | |
| 8,407,967 B2 * | 4/2013 | Brindle, Jr. | E04C 3/005 52/126.7 |
| 8,468,776 B2 | 6/2013 | Cortina-Ortega et al. | |
| 8,484,915 B1 * | 7/2013 | Abbas | E04C 3/34 405/232 |
| 8,572,905 B1 | 11/2013 | Driggers | |
| 8,650,831 B2 | 2/2014 | Ehsani | |
| 8,713,891 B2 | 5/2014 | Carr et al. | |
| 8,943,774 B2 * | 2/2015 | Richardson | E04G 23/02 52/514.5 |
| 9,096,986 B2 * | 8/2015 | Henderson | E04C 5/125 |
| 9,273,479 B2 * | 3/2016 | Richardson | E04G 23/0218 |
| 9,359,780 B2 * | 6/2016 | Richardson | E04G 23/02 |
| 9,574,359 B2 * | 2/2017 | Berset | E04G 23/0218 |
| 2002/0094239 A1 * | 7/2002 | Bradley | E02B 17/0026 405/216 |
| 2003/0085482 A1 | 5/2003 | Sincock et al. | |
| 2004/0154263 A1 | 8/2004 | Li et al. | |
| 2005/0246988 A1 * | 11/2005 | Patrick | E04B 5/14 52/309.11 |
| 2006/0070338 A1 | 4/2006 | Pantelides et al. | |
| 2008/0104924 A1 * | 5/2008 | Wilhour | E02D 27/42 52/741.11 |
| 2008/0121151 A1 | 5/2008 | Hallissy et al. | |
| 2010/0218708 A1 * | 9/2010 | Carr | E04G 23/0218 109/83 |
| 2011/0061321 A1 * | 3/2011 | Phuly | E02D 27/42 52/297 |
| 2011/0131914 A1 * | 6/2011 | Richardson | E04G 23/02 52/514.5 |
| 2011/0277410 A1 * | 11/2011 | Richardson | E04G 23/0218 52/426 |
| 2011/0308186 A1 * | 12/2011 | Cortina-Ortega | F03D 13/20 52/578 |
| 2012/0047830 A1 * | 3/2012 | Phuly | E02D 27/42 52/294 |
| 2012/0124937 A1 | 5/2012 | Teng et al. | |
| 2013/0195541 A1 * | 8/2013 | Pantelides | F16B 9/02 403/188 |
| 2014/0260023 A1 * | 9/2014 | Henderson | E02D 27/50 52/295 |
| 2015/0191924 A1 * | 7/2015 | Richardson | E04G 23/02 52/514.5 |
| 2016/0138285 A1 * | 5/2016 | Berset | E04G 23/0218 52/514.5 |
| 2016/0145882 A1 * | 5/2016 | Ehsani | E04G 23/0218 52/741.3 |
| 2016/0305139 A1 * | 10/2016 | Richardson | E04G 23/02 |
| 2017/0030096 A1 | 2/2017 | Pantelides et al. | |

FOREIGN PATENT DOCUMENTS

| | | |
|---|---|---|
| DE | 19939799 A1 | 2/2001 |
| EP | 2163800 A2 | 8/2009 |
| GB | 2210135 A | 1/1989 |
| JP | 11256836 A | 9/1999 |
| KR | 200205765 Y1 | 12/2000 |
| KR | 100729621 B1 | 6/2007 |
| WO | WO 2007/105018 A1 | 9/2007 |

OTHER PUBLICATIONS

Amico; "Stay-Form: the stay-in-place concrete form; Application Detail Manual Load Tables and Spec Data Sheets"; Jul. 11, 2014; pp. 1-37; Alabama Metal Industries Corporation; Birmingham, Alabama.

BASF; "Wabo A-P-E: Advanced Pile Encapsulation"; Jul. 11, 2014; 8 pages; BASF Building Systems; Shakopee, Minnesota.

Chalioris et al.; "Behaviour of rehabilitated RC beams with self-compacting concrete jacketing" Construction and Building Materials (55); Mar. 31, 2014; 257(17); Reed Business Information, Inc.

Karimi et al.; "Behavior of Slender Steel-Concrete Composite Columns Wrapped with FRP Jackets"; Journal of performance of constructed facilities 26.5; 2012;vol. 26 (5); American Society of Civil Engineers; Reston Virginia.

Lwin et al.; "U.S. Highway Bridge Performance from Recent Natural Hazards: Hurricanes"; J. Perform. Constr. Facil.; Jan./Feb. 2014; pp. 40-48.

(56) References Cited

OTHER PUBLICATIONS

Mirmiran et al.; "An innovative FRP-concrete composite construction for seismic regions"; Conference paper; May 15-17, 1995; vol. 2; pp. 1047-1054; Tehran, Iran.
Yi et al.; "Blast Load Effects on Highway Bridges. II: Failure Modes and Multihazard Correlations"; J. Bridge Eng.; American Society of Civil Engineers; 2013; pp. 04013024.1-04013024.12.
International search report dated Jan. 24, 2018 in International Application No. PCT/US17/56369, filed Oct. 12, 2017; 4 pages.

* cited by examiner

ELONGATE MEMBER REINFORCEMENT WITH A STUDDED COLLAR

RELATED APPLICATION(S)

This application is a continuation-in-part of U.S. application Ser. No. 14/455,570, filed Aug. 8, 2014, which claims the benefit of U.S. Provisional Patent Application No. 61/863,802 filed on Aug. 8, 2013, which are each incorporated herein by reference.

BACKGROUND

In recent years, fiber reinforced polymer (FRP) composites have emerged as an alternative to traditional materials for strengthening and rehabilitation of structures. The light weight of FRP, high-strength to weight ratio, corrosion resistance, and high efficiency of construction are among many of the advantages which encourage civil engineers to use this material. FRP composites have been used in the retrofit of bridge columns due to insufficient capacity or displacement ductility. FRP jackets can provide lateral confinement to the concrete columns that can substantially enhance their compressive strength and ultimate axial strain. Due to the increasing need for reinforcement and repair of structures, research has been carried out to investigate the behavior of FRP-confined concrete structures. Although many reinforcing methods result in moderate improvements in mechanical properties, the costs of such methods tend to outweigh the benefits and increase in strength. In addition, effective reinforcement and repair methods for structures such as columns, pipes, and walls with respect to a footing or beam have yet to be developed. Therefore, methods for reinforcement and repair of such structures continue to be sought.

SUMMARY

It has been recognized that development of improved methods for strengthening or reinforcing elongate members, such as columns, pipes, and walls, particularly with respect to a footing, foundation, or beam would be a significant advancement in the industry. Accordingly, an elongate member reinforcement system is provided. Such a system can comprise an elongate member, a collar secured about an end portion of the elongate member, a support layer surrounding the end portion of the elongate member, and a structural filler disposed between the support layer and the end portion of the elongate member. The collar can be disposed in the structural filler and can include a structural filler interface feature that mechanically couples the collar to the structural filler to facilitate transferring loads between the elongate member and the structural filler.

In one aspect, a method for reinforcing an elongate member is disclosed. The method can comprise securing a collar about an end portion of an elongate member. The method can further comprise disposing a support layer about the end portion of the elongate member. In addition, the method can comprise disposing a structural filler between the support layer and the end portion of the elongate member, wherein the collar is at least partially disposed in the structural filler and a structural filler interface feature of the collar mechanically couples the collar to the structural filler to facilitate transferring loads between the elongate member and the structural filler.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "cement" as any material which can be used to bind. For example, concrete can include crushed stone, sand, and a cement. Portland cement is a fired mixture of limestone and clay which, when hydrated, forms interlocking crystals which bind to the sand, stone, and one another. Cements can generally be classified as shrink, non-shrink, or expansive cements. The most commonly used cement for general construction is shrink cement.

As used herein, "post-tension" refers to tension created or induced in a material subsequent to formation. For example, post-tensioning of a support layer made of FRP occurs after curing of the FRP support layer to create a post-tensioned support layer having circumferential, or hoop stress.

The singular forms "a," "an," and "the" include plural referents unless the context clearly dictates otherwise. Thus, for example, reference to "a particle" includes reference to one or more of such materials and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Figure 1:
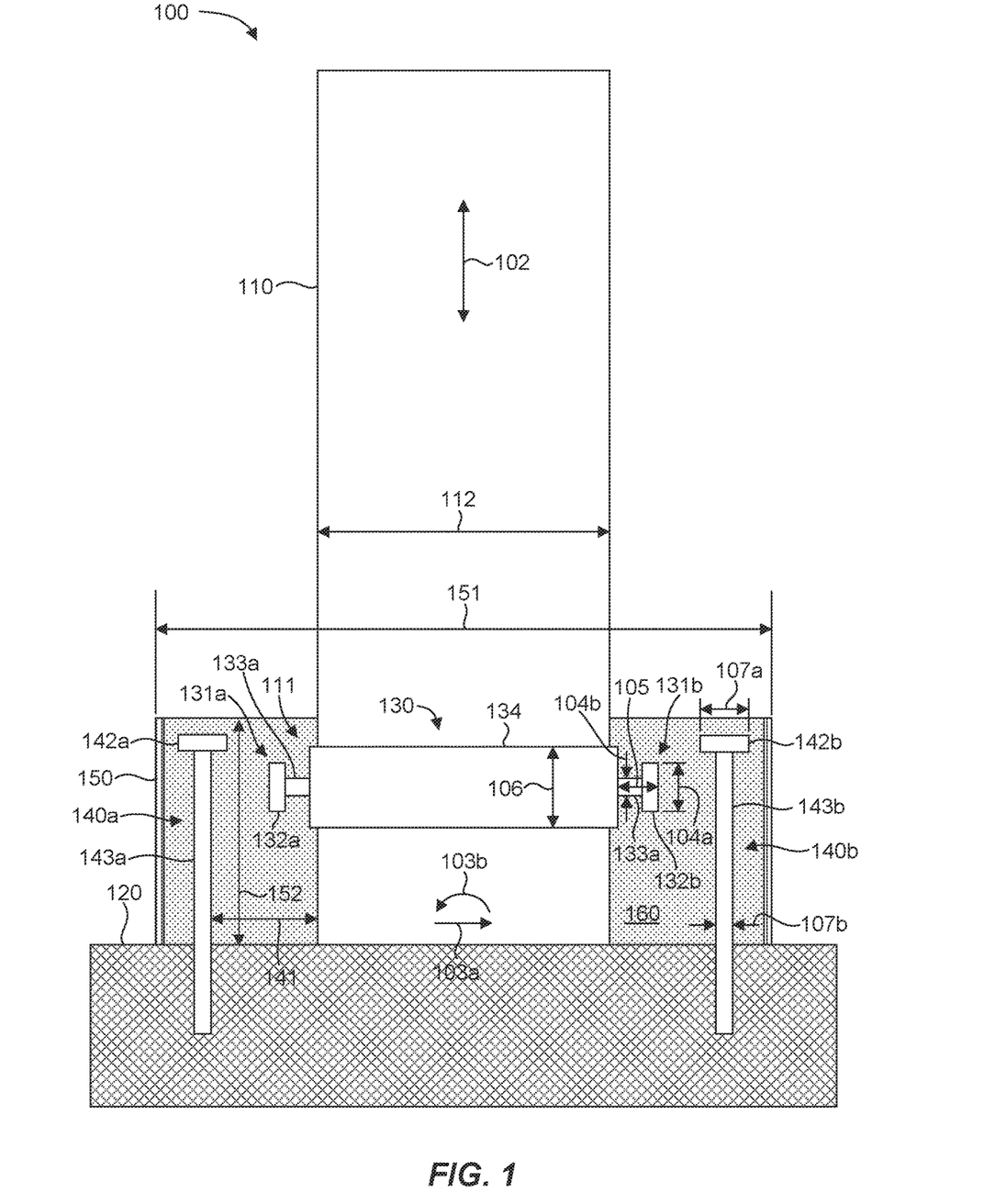
FIG. 1 illustrates a side view of an elongate member reinforcement system in accordance with an example of the present disclosure.

With reference to FIG. 1, a side view of an elongate member reinforcement system 100 is illustrated in accordance with an example of the present disclosure. The elongate member reinforcement system 100 can include an elongate member 110 and a base structure 120 associated with an end of the elongate member 110. Typically, the elongate member 110 will extend from the base structure 120 in a longitudinal direction 102 parallel to a longitudinal axis of the elongate member 110. The elongate member 110 can include a column, pipe, pile, tube, bollard, etc. and the base structure 120 associated with the end of the elongate member 110 can include a footing, a foundation, a floor, a capping, a cap beam, a truss, etc. In one aspect, the elongate member 110 can be a column that supports a bridge, freeway, etc. and used with a footing and/or a capping. The elongate member 110 can have any cross-sectional shape (i.e., round or square cross-section) or other configuration (i.e., a flange) and can be designed for any purpose, such as a structural component of a building and/or as a fluid conveying element. The elongate member 110 can be of any suitable size or proportion. Typically, the elongate member 110 will have a diameter 112 of between about 10 inches and about 60 inches, although diameters outside of this range are also contemplated. In one aspect, the diameter 112 can be greater than or equal to 2 feet. In addition, the elongate member 110 and/or the base structure 120 can be constructed of any suitable material, such as concrete, steel, wood, plastic, masonry, etc. In another aspect, the base structure 120 can be at least partially submerged in water or can be at least partially underground.

The elongate member reinforcement system 100 can also include a collar 130 secured about an end portion 111 of the elongate member 110 and one or more support members 140a, 140b coupled to the base structure 120. The reinforcement system 100 can further include a support layer 150 surrounding and longitudinally overlapping (i.e., in the longitudinal direction 102) the end portion 111 of the elongate member 110. The support layer 150 can define a space between the support layer 150 and the end portion 111 of the elongate member 110. Additionally, the reinforcement system 100 can include a structural filler 160 (e.g., a structural grout) disposed in the space between the support layer 150 and the elongate member 110 (e.g., about the end portion 111). Typically, the structural filler 160 is in contact with the end portion 111 of the elongate member 110, the collar 130, the support member 140a, 140b, and the support layer 150.

The collar 130 can be disposed in the structural filler 160 and can include a structural filler interface feature 131a, 131b that mechanically couples the collar 130 to the structural filler 160 to facilitate transferring loads between the elongate member 110 and the structural filler 160. The structural filler interface feature 131a, 131b can comprise one or more protrusions (e.g., studs) extending into or embedded within the structural filler 160. In one aspect, the structural filler interface feature 131a, 131b can include a head portion 132a, 132b and a stem portion 133a, 133b. A size or dimension 104a of the head portion 132a, 132b can be greater than a size or dimension 104b of the stem portion 133a, 133b to facilitate mechanically coupling or bonding the structural filler interface feature 131a, 131b (i.e., the collar 130) with the structural filler 160. In one aspect, the structural filler interface feature 131a, 131b can include surface features or geometry configured to enhance friction with the structural filler 160, such as that typically found on rebar, to facilitate mechanically coupling or bonding the structural filler interface feature 131a, 131b (i.e., the collar 130) with the structural filler 160.

The collar 130 can also have a band 134 that is proximate the elongate member 110. The structural filler interface feature 131a, 131b can extend away from the band 134 into the structural filler 160. Although the structural filler interface feature 131a, 131b is illustrated as extending perpendicular relative to the band 134, it should be recognized that the structural filler interface feature 131a, 131b can extend from the band 134 at any suitable angle. The band 134 and the structural filler interface feature 131a, 131b can be constructed of any suitable material, such as steel. In one aspect, the band 134 can be in tension about the elongate member 110. Further, the band 134 can fully circumscribe the elongate member. Typically, the band 134 can be oriented in intimate physical contact with the elongate member. The band can be placed during formation of the elongate member in one example. Alternatively, the band 134 can be placed in tension about the elongate member 110 in any suitable manner, such as by welding the band 134 about the elongate member 110. Thus, the band 134 can be constructed of any suitable material that can be welded, such as at least partially constructed of steel. The collar 130 and its components can have any suitable dimension. In one aspect, a radial length 105 of the structural filler interface feature 131a, 131b can be from about 0.5% to about 25.0% of the diameter 112 of the elongate member 110. Similarly, a diameter of the structural interface features 131a, 131b can typically range from about 0.4 to about 2 inches depending on the elongate member diameter 112 and expected loads. In another aspect, a height 106 of the collar 130 can be from about 5.0% to about 30.0% of the diameter 112 of the elongate member 110, and in some cases 5.0% to 23.0%.

The support member 140a, 140b can be coupled to the base structure 120 and laterally offset 141 from the elongate member 110. In addition, the support member 140a, 140b can extend about the end portion 111 of the elongate member 110 into the structural filler 160 between the support layer 150 and the elongate member 110. The support layer 150 can surround the end portion 111 of the elongate member 110 such that at least a portion of the support member 140a, 140b is between the support layer 150 and the elongate member 110. In one aspect, the support member 140a, 140b, the support layer 150, and/or the structural filler 160 can longitudinally "lap" (e.g., overlap) or project beyond the end portion 111 of the elongate member 110 in the longitudinal direction 102 to provide structural support for the elongate member 110. Thus, a load, such as a force 103a and/or a moment 103b, tending to cause relative movement of the end portion 111 of the elongate member 110 and the base structure 120 can be transferred through the collar 130, the structural filler 160, and the support member 140a, 140b to provide support for the elongate member 110 (e.g., the end portion 111). Thus, in one aspect, a studded collar can be associated with an elongate member to reinforce or enhance an interface or coupling between the structural filler and the elongate member. The support layer 150 can be disposed about the structural filler 160 to provide reinforcement and maintain the structural integrity of the structural filler 160. The load can be an externally applied load and/or a load internal to the elongate member 110 and/or the base structure 120. In one aspect, at least a portion of the load can be produced by a seismic event, an explosion (e.g. from a terrorist attack or accident), an impact (i.e., from a vehicle), and/or wind (e.g., from a hurricane or tornado). Thus, the reinforcement system 100 can protect the elongate member 110 and the base structure 120 from an extreme loading event.

The reinforcement system concepts and elements disclosed herein can be applied to new construction, retrofitted to existing construction, or utilized for repair or rehabilitation of a damaged structure (e.g., columns in support of bridges, freeways, etc.), such as due to corrosion or excessive loading. In some embodiments, the elongate member 110 can be coupled to the base structure 120 independent of the support member 140a, 140b, the support layer 150, and the structural filler 160, such as via rebar (not shown) internal to the elongate member extending into the base structure 120 and/or by being integrally formed with one another. In other words, the elongate member 110 is directly coupled to the base structure 120. In these cases, the support member 140a, 140b, the support layer 150, and the structural filler 160 can protect the connection and increase the stiffness of the elongate member 110, thereby improving the resistance of the connection to loads. In other embodiments, the elongate member 110 can simply be in contact with the base structure 120, such as by resting on the base structure 120. In other words, the reinforcement system 100 can allow no direct connection or coupling between the elongate member 110 and the base structure 120. Instead, a connection or coupling is made via the collar 130, the structural filler 160, and the support member 140a, 140b into the base structure 120. Thus, in some embodiments, the elongate member 110 is only coupled to the base structure 120 via the collar 130, the structural filler 160, and the support member 140a, 140b. In such cases, the collar 130, the support member 140a, 140b, the structural filler 160, and the support layer 150 can form or establish a connection between the elongate member 110 and the base structure 120 that has sufficient stiffness and strength to withstand a given loading event. For example, the collar 130, the support member 140a, 140b, the structural filler 160, and the support layer 150 can transfer tension (i.e., resulting from a moment load) between the elongate member 110 and the base structure 120. Thus, a bending load acting on the elongate member 110 can be transferred through the collar 130, the structural filler 160, and the support member 140a, 140b to the base structure 120.

As mentioned above, the support member 140a, 140b can be coupled to (e.g., extend into) the base structure 120 and, along with the support layer 150 and the structural filler 160, can provide support for the elongate member 110. In one aspect, the support member 140a, 140b can be configured, primarily, to withstand a tensile load. Accordingly, the support member 140a, 140b can be of any suitable configuration for this purpose. For example, the support member 140a, 140b can comprise a dowel, a bar, a cable, a wire, and/or any other suitable feature or structure for withstanding a tensile load. In one aspect, the support member 140a, 140b can be constructed of carbon, fiberglass, FRP, steel, or any other suitable structural material for a support member as disclosed herein. In another aspect, the support member 140a, 140b can be configured to mechanically couple or bond with the structural filler 160. For example, the support member 140a, 140b can comprise a head portion 142a, 142b and a stem portion 143a, 143b, respectively. A size or dimension 107a of the head portion 142a, 142b can be greater than a size or dimension 107b of the stem portion 143a (e.g., in a lateral direction), 143b to facilitate mechanically coupling or bonding the support member 140a, 140b with the structural filler 160. In one aspect, the support member 140a, 140b can include surface features or geometry configured to enhance friction with the structural filler 160, such as that typically found on rebar, to facilitate mechanically coupling or bonding the support member 140a, 140b with the structural filler 160.

The support layer 150 can be disposed about the structural filler 160 and the support member 140a, 140b to provide confinement compression for the structural filler 160 to maintain the structural integrity of the structural filler 160 about the elongate member 110 and the support member 140*a*, 140*b*. Accordingly, the support layer 150 can be configured to be in tension and, in particular, to withstand a hoop stress. In one aspect, the support layer 150 can comprise FRP material, which can comprise a fiber and polymeric matrix. The fiber can comprise a glass fiber, a carbon fiber, and/or an aramid fiber, although other fiber materials can also be used. Any suitable FRP material can be used that includes a fiber material and a polymeric matrix. Non-limiting examples of commercial products can include SikaWrap®, Aquawrap®, and the like. FRP material can enable the support layer 150 to be semi-rigid and elastically deformable. In one aspect, the support layer 150 can be configured to have a hoop stress along the fiber reinforced polymer material. The support layer 150 can be constructed of sheet material and can include one or more overlapping sheets and/or non-overlapping sheets. The support layer 150 can also comprise materials such as, but not limited to, a wire mesh, steel, aluminum, wire mesh cardboard, or plastic in certain cases. When an interior support layer is used, any suitable preformed formwork can be acceptable. Steel or close gridded wire mesh can be used in most applications where corrosion is not a concern. Alternatively, FRP is particularly useful where corrosion is of concern.

The support layer 150 can be of any suitable cross-sectional shape, which may be selected according to space constraints, mechanical properties, structural properties, and/or aesthetic properties. In one aspect, the support layer 150 can have a cross sectional shape similar to the cross sectional shape of the elongate member 110. Alternatively, a support layer 150 can have a cross sectional shape that is different from the cross sectional shape of elongate member 110. For example, the support layer 150 can have a circular cross sectional shape and the elongate member 110 can have a square cross-sectional shape. In another example, the elongate member 110 can have a rectangular cross sectional shape and the support layer 150 can have an elliptical cross sectional shape.

The support layer 150 can also define certain dimensions of the reinforcement system 100. For example, the support layer 150 can establish a diameter 151 and the height 152 of the reinforcement system 100 about the elongate member 110. Typically, the support layer 150 will have a diameter 151 of between about 10 inches and about 60 inches and a height 152 of between about 12 inches and about 48 inches, although dimensions outside of these ranges are also contemplated.

The structural filler 160 can include an expansive cement, conventional shrink cement, and/or a non-shrink cement. A typical unstressed FRP composite jacket does not participate in the confinement of concrete until the concrete starts expanding, which usually involves at least partial failure of the concrete and/or softening of the concrete. In one aspect of the present disclosure, however, an expansive concrete can be advantageously used between the support layer 150 and the elongate member 110 in order to post-tension the support layer 150 circumferentially and improve confinement of the elongate member 110 structural material. Thus, in a new construction, for example, expansive concrete can post-tension the support layer 150 in the hoop direction prior to application of vertical or axial loading to the elongate member 110. In another aspect, expansive concrete can fix the elongate member 110 in place with shear friction. A shrinkage compensated or non-shrinkage cement or concrete can also be used as the structural filler 160. A structural grout can be used as the grout to make non-shrink concrete. Alternatively, conventional shrink cement can be used, especially when relatively smaller diameters are used and where spiral reinforcing is used.

Figure 2A:
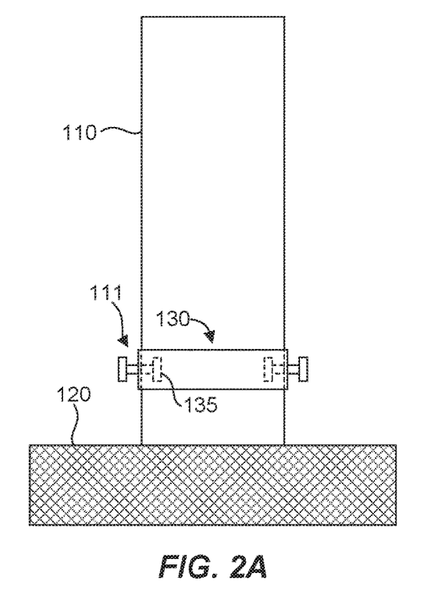
FIGS. 2A-2D illustrate steps for constructing the elongate member reinforcement system of FIG. 1, in accordance with an example of the present disclosure.

FIGS. 2A-2D illustrate steps for constructing the elongate member reinforcement system 100 of FIG. 1, in accordance with an example of the present disclosure. FIG. 2A shows an end of the elongate member 110 associated with the base structure 120. The elongate member 110 can simply be in contact with the base structure 120 or coupled to the base structure 120, such as via rebar (not shown) internal to the elongate member extending into the base structure 120 and/or by being integrally formed with one another. In this condition, the elongate member 110 may not be able to withstand various loading scenarios and may benefit from reinforcement. Thus, features of the reinforcement system 100 can be included to bolster the elongate member 110. Specifically, the collar 130 can be secured about the end portion 111 of the elongate member 110. The collar 130 can be secured to the elongate member 110 in any suitable manner. For example, the collar 130 can be put in tension about the elongate member 110 (e.g., by welding the collar 130 about the elongate member 110) or integrally coupled with the elongate member 110, such as via disposing an inwardly extending elongate member interface feature 135 (e.g., a protrusion) in the elongate member 110. For new construction, the collar 130 can be integrated with the elongate member 110 at the formation stage of the elongate member 10, such as by forming the elongate member 110 about the elongate member interface feature 135 such that the elongate member interface feature 135 is embedded in the elongate member 110 (e.g., inwardly oriented protrusions embedded in a cast column).

Figure 2B:
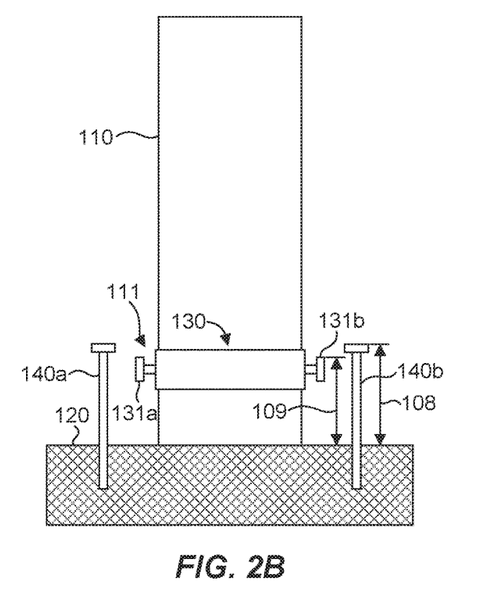

In some embodiments, as shown in FIG. 2B, the support member 140*a*, 140*b* can be coupled to the base structure 120 such that the support member 140*a*, 140*b* is laterally offset from the elongate member 110 and extends about the end portion 111 of the elongate member 110. The support member 140*a*, 140*b* can be coupled to the base structure 120 in any suitable manner, such as by extending the support member 140*a*, 140*b* into the base structure 120 (e.g., drilling a hole in the base structure 120 and bonding the support member 140*a*, 140*b* in the hole), or by forming base structure 120 about a portion of the support member 140*a*, 140*b* (e.g., in a new construction). The support member 140*a*, 140*b* and the collar 130 can have any suitable relationship relative to one another. In one aspect, the support member 140*a*, 140*b* can extend a distance 108 from the base structure 120 greater than a distance 109 of the structural filler interface feature 131*a*, 131*b* of the collar 130 from the base structure 120, as illustrated. It should be recognized that any suitable distance relationship of the collar 130 and the support member 140*a*, 140*b* extending from the base structure 120 can be employed. For example, the distances 108, 109 can be equal or the distance 109 can be greater than the distance 108.

Figure 2C:
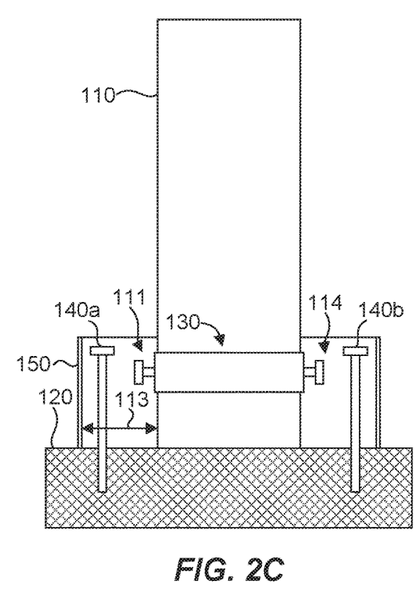
Figure 2D:
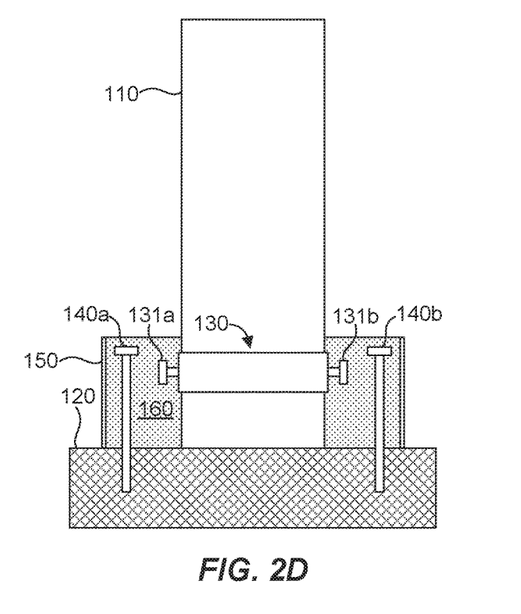

As shown in FIG. 2C, the support layer 150 can be disposed about the end portion 111 of the elongate member 110. For example, the collar 130 and the support member 140*a*, 140*b* can be at least partially disposed between the support layer 150 and the elongate member 110. In one aspect, the support layer 150 can be premade in an oval, cylindrical, or other shape, and used as a stay-in-place form. In another aspect, the support layer 150 can be spliced around the elongate member 110 and/or constructed in-situ around the elongate member 110. A lateral gap 113 between the support layer 150 and the elongate member 110 can depend on the dimensions of the elongate member 110 as well as the size of the support member 140a, 140b, but is typically at least 4 inches. With the support layer 150 around the elongate member 110, the collar 130, and the support member 140a, 140b, there is a space 114 between the support layer 150 and the elongate member 110. In one aspect, the support layer 150 can be located adjacent to, or "flush" with, the support base structure 120. This can prevent or minimize leakage of the structural filler 160 between the support layer 150 and the base structure 120 when the structural filler 160 is deposited or disposed in the space 114 between the support layer 150 and the end portion of the elongate member 110, as shown in FIG. 2D. In one aspect, the collar 130 can be at least partially disposed in the structural filler 160, such that the structural filler interface feature 131a, 131b of the collar 130 can mechanically couple the collar 130 to the structural filler 160 to facilitate transferring loads between the elongate member 110 and the structural filler 160.

In some embodiments, an expansive concrete can be disposed between the support layer 150 and the elongate member 110 to post-tension the support layer 150 circumferentially and improve confinement of the elongate member 110 structural material and/or fix the elongate member 110 in place with shear friction. When using a shrinkage compensated or non-shrinkage cement or concrete as the structural filler 160, the non-shrinkage concrete can be placed into a premade support layer about the elongate member 110 and the support members 140a, 140b. Once the aging of the concrete is stable, the support layer 150 can be wrapped around the structural filler 160 using a wet lay-up process.

In one aspect, the support layer 150 can comprise at least two pieces that can be placed around the elongate member 110 to form the support layer 150. This can be achieved by separating the support layer 150 into two pieces and placing the two pieces around the elongate member 110 to form the support layer 150. To reinforce an elongate member 110, it may be necessary to separate the support layer 150 longitudinally into a first piece and a second piece. The first piece and second piece can then be placed around the elongate member 110 to reform the support layer 150, leaving the open space 114 between the elongate member 110 and the support layer 150.

In a particular aspect, once the first piece and second piece have been placed around the elongate member 110 they can be coupled to one another with an adhesive or spliced with a vertical FRP composite strip along each seam between the first piece and second piece so as to form a unitary support layer 150. In one aspect, after the first and second piece of the support layer 150 have been spliced with a vertical FRP composite strip, additional FRP material may be wrapped around the support layer 150. Typically the wrapping can be done with a single continuous sheet. However, multiple sheets can be wrapped in a wet lay-up process followed by curing of the polymer resin. The number of layers will typically range from 1 to about 14 additional layers. Additional sheets can provide auxiliary reinforcement to the elongated element, and can be applied to exterior surfaces of the element, inside the support layer. In additional to doweling to the footing, such additional layers can move the yielding zone away from the interface.

In one aspect, FRP materials can be placed along a longitudinal axis of the elongate member 110 in direct contact with the elongate member 110, either during or after formation of the FRP shell, for increased flexural resistance of the elongate member 110, if required.

Many applications will call for a FRP support layer 150 that is pre-manufactured. However, many applications will require manufacture of the support layer 150. In these applications, a mold can be prepared in order to form the FRP support layer 150. A mold can be prepared to correspond with a desired final shape of the elongate member 110. A mold is not necessarily the same shape as the elongate member 110. Frequently, a rectangular or square elongate member 110 can be modified to produce a circular or elliptical elongate member 110 of slightly larger width.

Once the mold has been prepared, the mold can be wrapped with at least one layer of FRP material to form the support layer 150. The mold can then be removed leaving the support layer 150 as an independent structure. Typically, the wrapping can be done with a single continuous sheet. However, multiple sheets can be wrapped in a wet lay-up process followed by curing of the polymer resin. The sheets may be cut to a desired size or as lengths of fiber strands, which can be wrapped and/or laid as desired to form a particular shape. Most often, the number of layers can range from 1 to about 14 additional layers.

Wrapping of the mold may include a wet layup of resin coated fibers followed by a curing of the resin. Once the resin has cured, the support layer 150 can be divided longitudinally into at least a first piece and a second piece so that it can be used in applications that require retrofitting elongate member 110.

In one aspect, support layer 150 materials can be "prepreg" and/or "pre-cured." In another aspect, the resin or epoxy used can be configured to be activated to cure at an ambient temperature or to cure at an elevated temperature.

Figure 3:
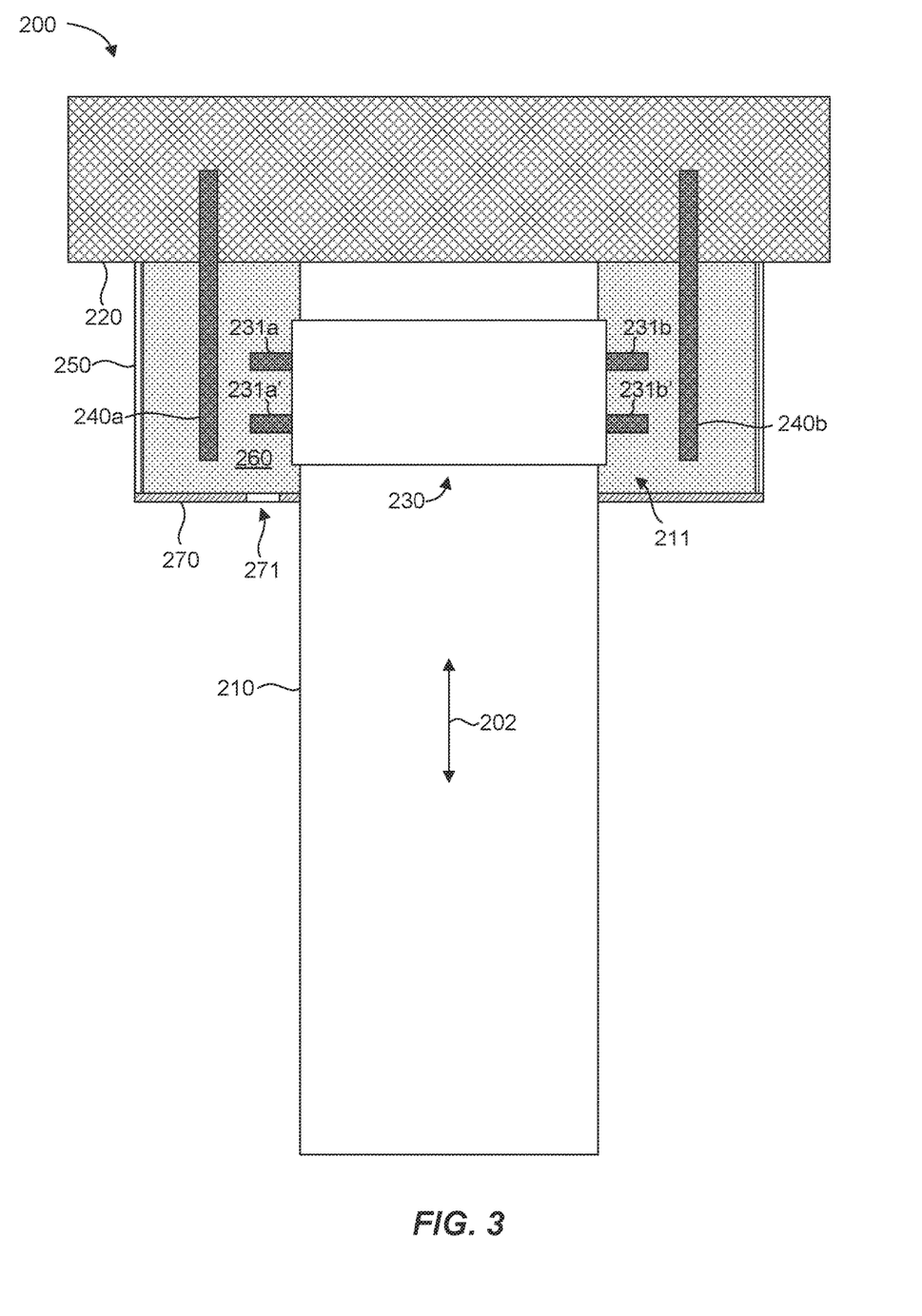
FIG. 3 illustrates a side view of an elongate member reinforcement system in accordance with another example of the present disclosure.

FIG. 3 illustrates a side view of an elongate member reinforcement system 200 in accordance with another example of the present disclosure. The elongate member reinforcement system 200 is similar in many respects to the elongate member reinforcement system 100 of FIG. 1. For example, the elongate member reinforcement system 200 can include an elongate member 210, a base structure 220 associated with an end of the elongate member 210, a collar 230 secured about an end portion 211 of the elongate member 210, one or more support members 240a, 240b coupled to the base structure 220, a support layer 250 surrounding the end portion 211 of the elongate member 210, and a structural filler 260 disposed between the support layer 250 and the elongate member 210. In this case, the end of the elongate member 210 is an upper end. Thus, the base structure 220 associated with the end of the elongate member 210 can comprise a cap beam, truss, etc. In one aspect, both the upper and lower ends of the elongate member 210 can be reinforced in accordance with the principles disclosed herein.

The elongate member reinforcement system 200 can include a retaining member 270 to retain and support the structural filler 260 as it cures and solidifies. The retaining member 270 can include an access opening 271 to facilitate disposing the structural filler between the support layer 250 and the elongate member 210, after which the access opening can be closed or plugged to prevent leakage of the structural filler 260 prior to solidification. Although a wide variety of materials may be used, the retaining member can be made of FRP, steel, wood or plastic, and can bond to the adjacent support layer to contain the filler material.

The collar 230 includes structural filler interface features 231a, 231a', 231b, 231b', which can be disposed in any suitable configuration about the collar 230. In this embodiment, multiple structural filler interface features are arranged or spaced in a longitudinal direction 202 of the elongate member 210. For example, the structural filler interface features 231a, 231a' are spaced longitudinally from one another, and the structural filler interface features 231*b*, 231*b*' are spaced longitudinally from one another. In addition, the structural filler interface features 231*a*, 231*a*', 231*b*, 231*b*' are illustrated without heads. In one aspect, the structural filler interface features 231*a*, 231*a*', 231*b*, 231*b*' can have a substantially constant diameter along their longitudinal axes. For example, the structural filler interface features 231*a*, 231*a*', 231*b*, 231*b*' can be rebar studs, which can have surface textures or recesses to capture a portion of the structural filler 260 to mechanically couple or bond the structural filler interface features 231*a*, 231*a*', 231*b*, 231*b*' with the structural filler 260. Alternatively, the structural filler interface features may have a tapered shape such that distal ends remote from the collar have a larger cross-section and diameter than proximate ends. In such cases, tapering of the interface features can most often range from a 1° to 20° off a longitudinal axis of the interface feature.

The elongate member reinforcement system 200 also includes support members 240*a*, 240*b* without heads. In one aspect, the support members 240*a*, 240*b* can have a substantially constant diameter along a longitudinal axis. For example, the support members 240*a*, 240*b* can be rebar, which can have surface textures or recesses to capture a portion of the structural filler 260 to mechanically couple or bond the support member 240*a*, 240*b* with the structural filler 260.

Figure 4:
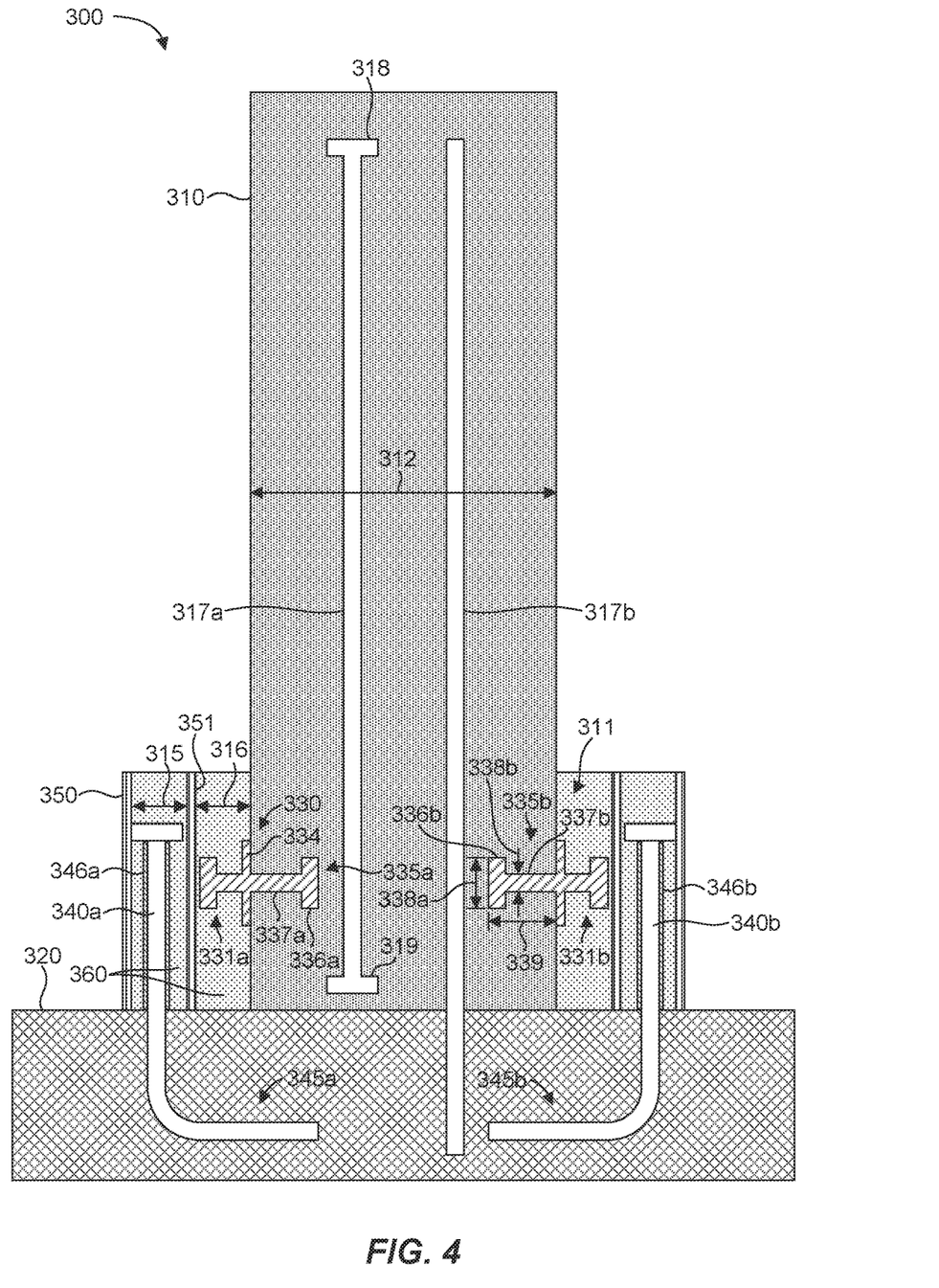
FIG. 4 illustrates a side view of an elongate member reinforcement system in accordance with yet another example of the present disclosure.

FIG. 4 illustrates a side view of an elongate member reinforcement system 300 in accordance with yet another example of the present disclosure. The elongate member reinforcement system 300 is similar in many respects to the elongate member reinforcement systems discussed above. For example, the elongate member reinforcement system 300 can include an elongate member 310, a base structure 320 associated with an end of the elongate member 310, a collar 330 secured about an end portion 311 of the elongate member 310, one or more support members 340*a*, 340*b* coupled to the base structure 320, a support layer 350 surrounding the end portion 311 of the elongate member 310, and a structural filler 360 disposed between the support layer 350 and the elongate member 310.

In this case, the collar 330 (shown in cross-section) includes an elongate member interface feature 335*a*, 335*b* that secures the collar 330 to the elongate member 310. For example, the elongate member interface feature 335*a*, 335*b* can comprise a protrusion or stud extending into the elongate member 310, which can integrate the collar 330 with the elongate member 310. The elongate member interface feature 335*a*, 335*b* can extend inwardly from a band 334 of the collar 330 to engage the elongate member 310, and a structural filler interface feature 331*a*, 331*b* can extend outwardly from the band 334 to engage the structural filler 360. The elongate member interface feature 335*a*, 335*b* can be particularly beneficial when used with a new construction, for example, with the elongate member interface feature 335*a*, 335*b* embedded in a cast column.

In one aspect, the elongate member interface feature 335*a*, 335*b* can include a head portion 336*a*, 336*b* and a stem portion 337*a*, 337*b*. A size or dimension 338*a* of the head portion 336*a*, 336*b* can be greater than a size or dimension 338*b* of the stem portion 337*a*, 337*b* to facilitate mechanically coupling or bonding the elongate member interface feature 335*a*, 335*b* (i.e., the collar 330) with the elongate member 310. In one aspect, the elongate member interface feature 335*a*, 335*b* can include surface features or geometry configured to enhance friction with the elongate member 310, such as that typically found on rebar, to facilitate mechanically coupling or bonding the elongate member interface feature 335*a*, 335*b* (i.e., the collar 330) with the elongate member 310. As mentioned above, the collar 330 and its components can have any suitable dimension. In one aspect, a radial length 339 of the elongate member interface feature 335*a*, 335*b* can be from about 5.0% to about 25.0% of a diameter 312 of the elongate member 310.

In some embodiments, the elongate member 310 can comprise concrete having one or more reinforcement members 317*a*, 317*b* embedded in the concrete. The reinforcement members 317*a*, 317*b* can be any suitable reinforcement member, such as rebar, headed studs, and/or U-shaped steel dowels. Heads 318, 319 can facilitate putting the reinforcement member 317*a* in tension during dynamic loading (e.g., earthquakes). In one aspect, the reinforcement member 317*b* extends into the base structure 320 to directly couple the elongate member 310 to the base structure 320. In another aspect, the reinforcement member 317*a* may not contact the base structure 320 directly, but instead be contained fully within the elongate member 310. In this case, the elongate member 310 is indirectly coupled to the base structure 320 via the collar 330, the structural filler 360, and the support members 340*a*, 340*b*. The support members 340*a*, 340*b* can be coupled to the base structure 320 in any suitable manner. For example, end portions 345*a*, 345*b* of the support members 340*a*, 340*b* can be angled or bent to provide mechanical interference preventing or inhibiting removal of the support members 340*a*, 340*b* from the base structure 320.

In addition, the elongate member reinforcement system 300 includes a support layer 351 between the support layer 350 and the elongate member 310. In one aspect, a first portion of the structural filler 360 can be disposed between the support layer 351 and the elongate member 310 and a second portion of the structural filler 360 can be disposed between the support layer 350 and the support layer 351. In other words, multiple support layers 350, 351 can be formed around the end portion 311 of the elongate member 310 with a gap 315 between them. The gap 315 and a gap 316 between the support layer 351 and the elongate member 310 can be filled with structural filler 360. In one aspect, the support layer 350 can be proximate the support members 340*a*, 340*b*. In another optional aspect, the support members 340*a*, 340*b* can include a spiral reinforcement 346*a*, 346*b*, respectively, wound around the support members. Such spiral reinforcement can typically be steel or FRP, although other materials may also be suitable. For example, support layer 350 can be FRP, steel wood, etc. and while support layer 351 can be steel mesh, steel spiral, FRP mesh, or FRP spiral.

Figure 5:
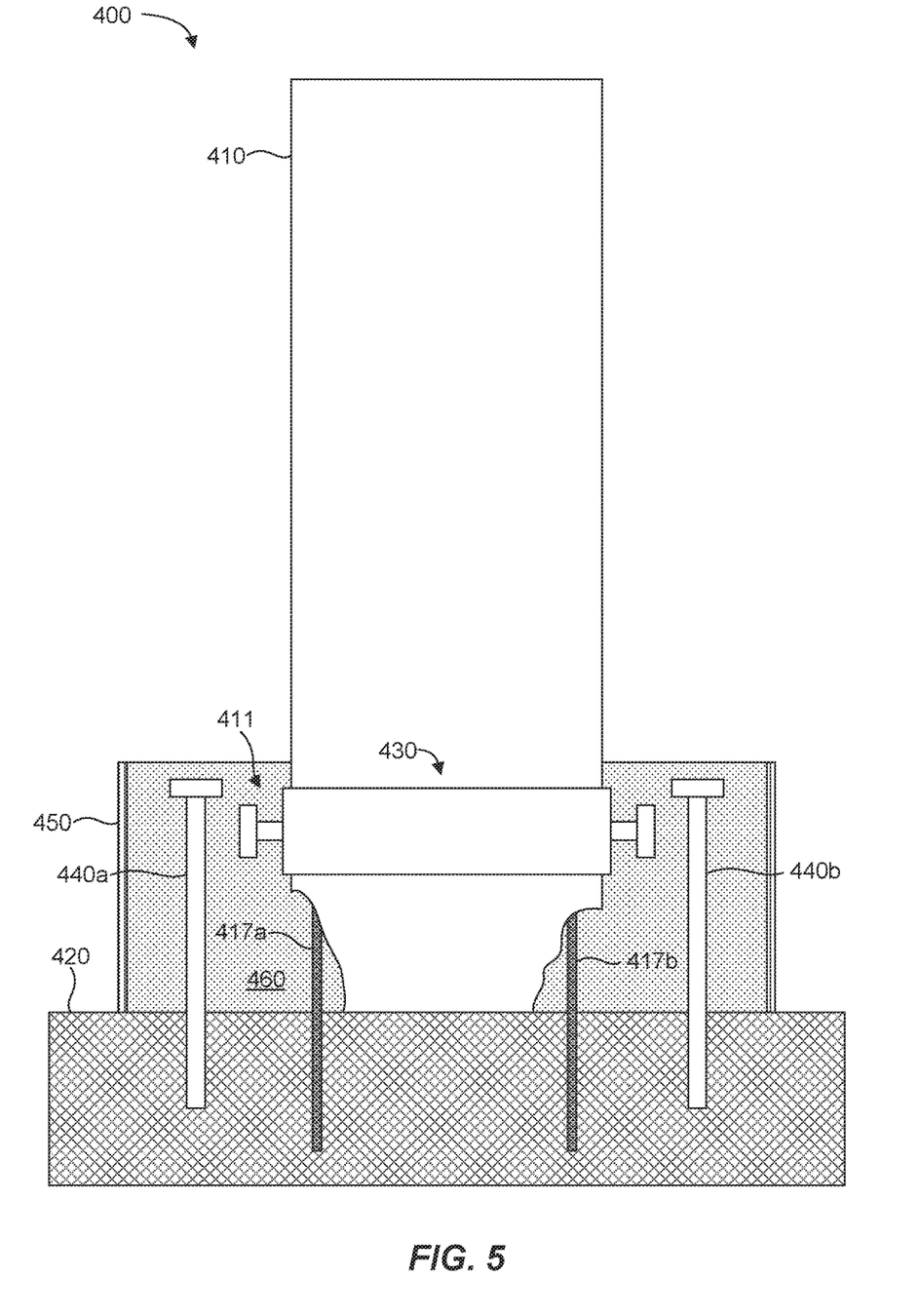
FIG. 5 illustrates a side view of an elongate member reinforcement system in accordance with still another example of the present disclosure.

FIG. 5 illustrates a side view of an elongate member reinforcement system 400 in accordance with still another example of the present disclosure. The elongate member reinforcement system 400 is similar in many respects to the elongate member reinforcement systems discussed above. For example, the elongate member reinforcement system 400 can include an elongate member 410, a base structure 420 associated with an end of the elongate member 410, a collar 430 secured about an end portion 411 of the elongate member 410, one or more support members 440*a*, 440*b* coupled to the base structure 420, a support layer 450 surrounding the end portion 411 of the elongate member 410, and a structural filler 460 disposed between the support layer 450 and the elongate member 410. In this case, the elongate member 410 includes one or more reinforcement members 417*a*, 417*b*, such as steel reinforcement or rebar. In one aspect, the reinforcement member 417*a*, 417*b* can be exposed to the structural filler 460. Thus exposed, the reinforcement member 417a, 417b can mechanically couple or bond with the structural filler 460, thereby improving the coupling of the structural filler 460 to the elongate member 410. Such exposure of the reinforcement member 417a, 417b can be due to erosion of the elongate member 410, loading damage, and/or due to intentional removal of material from the elongate member 410 to prepare the elongate member 410 prior to reinforcement. The elongate member reinforcement system 400 can therefore be effective even when the reinforcement member 417a, 417b is debonded or broken.

Figure 6A:
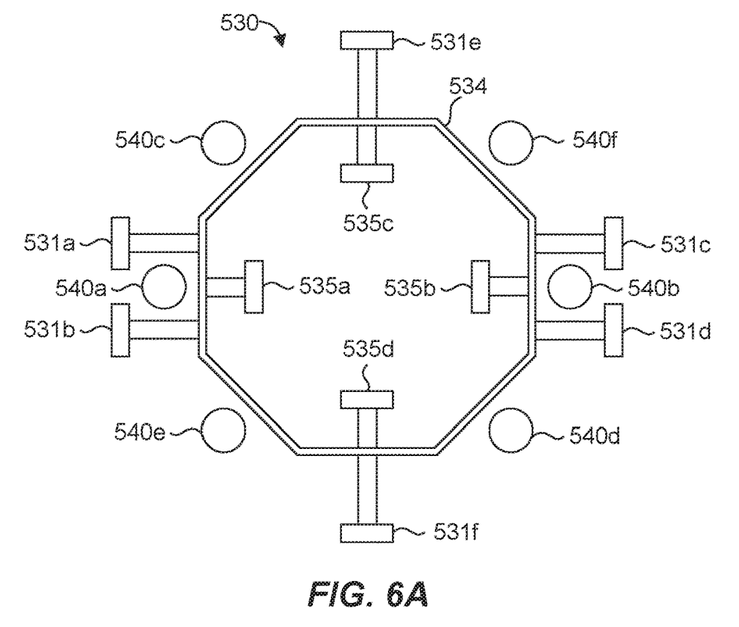
FIG. 6A illustrates an end view of a collar and support member configuration in accordance with an example of the present disclosure.
Figure 6B:
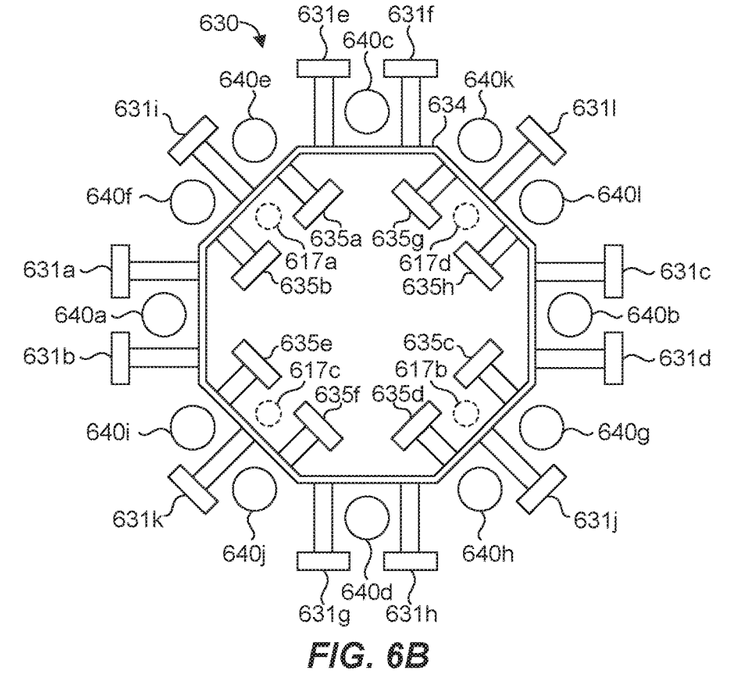
FIG. 6B illustrates an end view of a collar and support member configuration in accordance with another example of the present disclosure.

FIGS. 6A and 6B illustrate end views of collar and support member configurations in accordance with several examples of the present disclosure. Other features and components of an elongate member reinforcement system, such as an elongate member, structural filler, and a support layer, have been omitted for clarity. FIG. 6A shows a collar 530 having a band 534 with multiple structural filler interface features 531a-f extending outwardly from the band 534 and multiple elongate member interface features 535a-d extending inwardly from the band 534. In one aspect, the collar 530 can include at least three structural filler interface features and/or at least three elongate member interface features, although any suitable number of each component can be utilized. Multiple support members 540a-f are located about an exterior of the collar 530.

As illustrated, the band 534 has an octagonal shape, although a band can have any suitable shape to fit a given elongate member or column. The structural filler interface features 531a-f and the elongate member interface features 535a-d can be distributed in any suitable manner about a circumference of the collar 530 (i.e., about the band 534). For example, structural filler interface features 531a-b and 531c-d are arranged in pairs that extend from opposite sides of the band 534. The structural filler interface features 531e and 531f are arranged individually such that single structural filler interface features extend from opposite sides of the band 534 orthogonal to the arrangement of opposite structural filler interface feature pairs 531a-b and 531c-d. In addition, the elongate member interface features 535a-d are arranged individually and extend from the same sides of the band 534 occupied by the structural filler interface features 531a-f. This arrangement locates structural filler interface features and elongate member interface features on four sides of the band 534 while leaving four sides of the band 534 vacant. It should be recognized that some embodiments do not include elongate member interface features.

The support members 540a-f are arranged individually about six sides of the band 534. A single support member 540a is disposed between the two of the structural filler interface features 531a-b on one side of the band 534, and a single support member 540b is disposed between the two of the structural filler interface features 531c-d on the opposite side of the band 534. Such interlocking or intermingling of support members and structural filler interface features can "tie" these components together and therefore enhance the ability of a reinforcement system to transfer loads between an elongate member and a base structure. The other four support member 540c-f are located proximate the vacant sides of the band.

FIG. 6B shows a collar 630 having a band 634 with multiple structural filler interface features 631a-l extending outwardly from the band 634 and multiple elongate member interface features 635a-h extending inwardly from the band 634. Multiple support members 640a-l are located about an exterior of the collar 630.

The band 634 in this example has an octagonal shape, although any suitable shape can be utilized. The structural filler interface features 631a-l and the elongate member interface features 635a-h can be distributed in any suitable manner about a circumference of the collar 630 (i.e., about the band 634). For example, structural filler interface features 631a-b and 631c-d are arranged in pairs that extend from opposite sides of the band 634, and structural filler interface features 631e-f and 631g-h are arranged in pairs that extend from opposite sides of the band 634. The opposite structural filler interface feature pairs 631a-b and 631c-d are orthogonal to the of opposite structural filler interface feature pairs 631e-f and 631g-h. The structural filler interface features 631i and 631j are arranged individually such that single structural filler interface features extend from opposite sides of the band 634, and the structural filler interface features 631k and 631l are arranged individually such that single structural filler interface features extend from opposite sides of the band 634 orthogonal to the arrangement of opposite structural filler interface feature 631i and 631j. In addition, the elongate member interface features 635a-h are arranged in pairs and extend from the same sides of the band 634 occupied by the individual structural filler interface features 631i-l. This arrangement locates structural filler interface features on all eight sides of the band 534 and elongate member interface features on four sides of the band 634. It should be recognized that some embodiments do not include elongate member interface features.

The support members 640a-l are arranged individually about four sides of the band 634, and in pairs about the other four sides of the band 634. Single or individual support members 640a, 640b, 640c, 640d are disposed between the pairs of structural filler interface features 631a-b, 631c-d, 631e-f, 631g-h, respectively. The single or individual structural filler interface features 631i, 631j, 631k, 631l are disposed between pairs of support members 640e-f, 640g-h, 640i-j, 640k-l, respectively. The support members and structural filler interface features are therefore intermingled on all sides of the band 634. Such interlocking or intermingling of support members and structural filler interface features can "tie" these components together and therefore enhance the ability of a reinforcement system to transfer loads between an elongate member and a base structure.

In some embodiments, reinforcement members within an elongate member or column can be disposed between elongate member interface features to intermingle and "tie" these components together and therefore enhance the strength of the elongate member. For example, single or individual reinforcement members 617a, 617b, 617c, 617d can be disposed between the pairs of elongate member interface features 640a-b, 640c-d, 640e-f, 640g-h, respectively.

Figure 7:
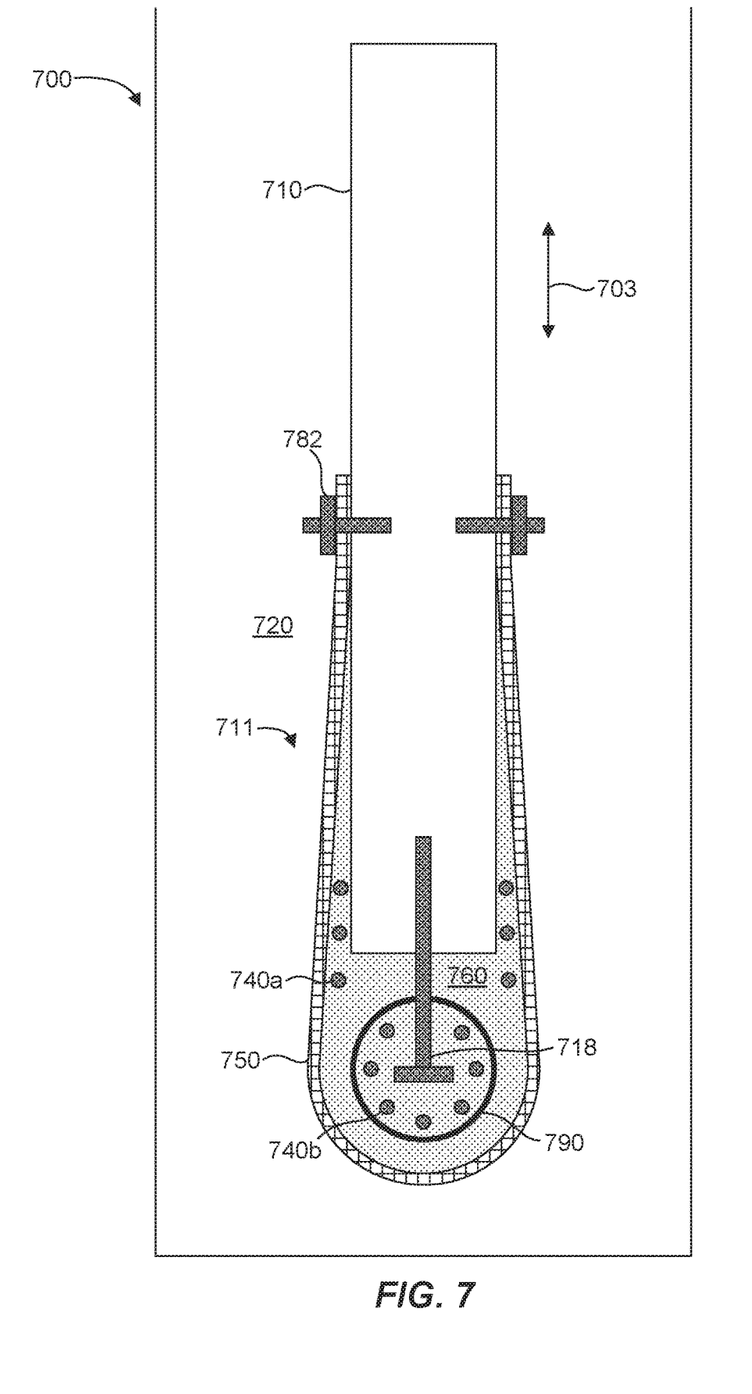
FIG. 7 illustrates a plan view of an elongate member reinforcement system in accordance with a further example of the present disclosure.

FIG. 7 illustrates a plan view of an elongate member reinforcement system 700 in accordance with a further example of the present disclosure. The elongate member reinforcement system 700 includes several similarities with the elongate member reinforcement systems discussed above. For example, the elongate member reinforcement system 700 can include an elongate member 710, a base structure 720 and/or vertical axial loads associated with an end of the elongate member 710, one or more support members 740a, 740b coupled to the base structure 720, a support layer 750 surrounding an end portion 711 of the elongate member 710, and a structural filler 760 disposed between the support layer 750 and the elongate member 710. In this case, the elongate member comprises a wall, such as a shear wall. The reinforcement system 700 can be configured to provide increased resistance to loads in direction 703. In one aspect, the end portion 711 of the wall 710 can comprise a lower end portion and/or a side end portion of the wall 710. In addition, the support layer 750 is attached to the wall 710. The support layer 750 can be attached to the wall 710 by any suitable means, such as a bolt 782, drilled anchor, FRP anchor, or other fastener. A reinforcement member 718 can be coupled to the wall 710 and configured to extend from the wall 710. In one aspect, the reinforcement member 718 can include a head feature to improve the coupling with the structural filler 760. The support member 740b can be surrounded by an internal support structure 790, such as a spiral or hoop formed of steel or FRP. Any suitable number of support members 740a, 740b can be utilized in any suitable arrangement or configuration. Furthermore, the end of member 710 which contacts filler 760 can be shaped or grooved to increase bonding and interaction with the filler 760.

In any of the above configurations, the structural filler can optionally further comprise an embedded reinforcement such as, but not limited to, rebar, welded wire fabric, fiber reinforced concrete, and the like. In the case of rebar and welded fabric, the reinforcement can be oriented throughout a height of the structural filler and can be oriented in at least one of horizontal and circumferential directions.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An elongate member reinforcement system, comprising:
    an elongate member;
    a collar secured about an end portion of the elongate member;
    a support layer surrounding the end portion of the elongate member; and
    a structural filler disposed between the support layer and the end portion of the elongate member,
    wherein the collar is disposed in the structural filler and includes a structural filler interface feature that is spaced apart from the support layer and mechanically couples the collar to the structural filler to facilitate transferring loads between the elongate member and the structural filler, and
    wherein the structural filler interface feature comprises a protrusion extending into the structural filler, the protrusion having a head portion and a stem portion, wherein a size of the head portion is greater than a size of the stem portion to facilitate mechanically coupling structural filler interface feature with the structural filler.

2. The system of claim 1, wherein the structural filler interface feature comprises a plurality of structural filler interface features distributed about a circumference of the collar.

3. The system of claim 1, wherein the structural filler interface feature comprises at least three structural filler interface features.

4. The system of claim 1, wherein the collar comprises a band proximate the elongate member.

5. The system of claim 4, wherein the structural filler interface feature extends away from the band into the structural filler.

6. The system of claim 4, wherein the band is in tension about the elongate member.

7. The system of claim 6, wherein the band is constructed at least partially of steel.

8. The system of claim 1, wherein the collar comprises an elongate member interface feature that secures the collar to the elongate member.

9. The system of claim 8, wherein the elongate member comprises concrete, and the elongate member interface feature comprises a protrusion extending into the concrete.

10. The system of claim 8, wherein the elongate member interface feature comprises a plurality of elongate member interface features distributed about a circumference of the collar.

11. The system of claim 8, wherein the elongate member interface feature comprises at least three elongate member interface features.

12. The system of claim 8, wherein a radial length of the elongate member interface feature is from about 5.0% to about 25.0% of a diameter of the elongate member.

13. The system of claim 1, further comprising a base structure associated with an end of the elongate member.

14. The system of claim 13, further comprising a support member coupled to the base structure, the support member being laterally offset from the elongate member and extending about the end portion of the elongate member into the structural filler between the support layer and the elongate member, the support member having a second head portion and a second stem portion, a lateral size dimension of the second head portion being greater than a lateral size dimension of the second stem portion to mechanically bond the support member with the structural filler, wherein a load tending to cause relative movement of the end portion of the elongate member and the base structure is transferred through the collar, the structural filler, and the support member to provide support for the elongate member.

15. The system of claim 14, wherein the elongate member is only coupled to the base structure via the collar, the structural filler, and the support member.

16. The system of claim 14, wherein the structural filler interface feature comprises a plurality of structural filler interface features and the support member is disposed between at least two of the structural filler interface features.

17. The system of claim 13, wherein the elongate member comprises concrete having a reinforcement member embedded therein.

18. The system of claim 17, wherein the reinforcement member extends into the base structure to directly couple the elongate member to the base structure.

19. The system of claim 17, wherein the reinforcement member comprises rebar, headed studs, U-shaped steel dowels, or a combination thereof.

20. The system of claim 13, wherein the base structure comprises a footing, a foundation, or a cap beam.

21. The system of claim 1, wherein a diameter of the elongate member is greater than or equal to 2 feet.

22. The system of claim 1, wherein a height of the collar is from about 5.0% to about 23.0% of a diameter of the elongate member.

23. The system of claim 1, wherein a radial length of the structural filler interface feature is from about 0.5% to about 25.0% of a diameter of the elongate member.

24. A method for reinforcing an elongate member, comprising:

securing a collar about an end portion of an elongate member;

disposing a support layer about the end portion of the elongate member; and disposing a structural filler between the support layer and the end portion of the elongate member, wherein the collar is at least partially disposed in the structural filler and a structural filler interface feature of the collar is spaced apart from the support layer and mechanically couples the collar to the structural filler to facilitate transferring loads between the elongate member and the structural filler, wherein the structural filler interface feature comprises a protrusion extending into the structural filler, the protrusion having a head portion and a stem portion, wherein a size of the head portion is greater than a size of the stem portion to facilitate mechanically coupling structural filler interface feature with the structural filler.

25. The method of claim 24, wherein securing the collar about the end portion of the elongate member comprises putting the collar in tension about the end portion of the elongate member.

26. The method of claim 24, wherein securing the collar about the end portion of the elongate member comprises disposing an elongate member interface feature of the collar in the elongate member.

27. The method of claim 26, wherein the elongate member comprises concrete, and disposing the elongate member interface feature of the collar in the elongate member comprises forming concrete about the elongate member interface feature.

28. The method of claim 24, further comprising coupling a support member to a base structure that is associated with an end of the elongate member such that the support member is laterally offset from the elongate member and extends about the end portion of the elongate member, and the support member is disposed in the structural filler between the support layer and the elongate member, the support member having a second head portion and a second stem portion, a lateral size dimension of the second head portion being greater than a lateral size dimension of the second stem portion to mechanically bond the support member with the structural filler, wherein a load tending to cause relative movement of the end portion of the elongate member and the base structure is transferred through the collar, the structural filler, and the support member to provide support for the elongate member.

29. The method of claim 28, wherein coupling the support member to the base structure comprises extending the support member into the base structure.

30. The method of claim 28, wherein coupling the support member to the base structure comprises forming base structure about a portion of the support member.

31. The method of claim 28, wherein the collar comprises a plurality of structural filler interface features, and further comprising disposing the support member between at least two of the structural filler interface features.

* * * * *